June 14, 1966  R. R. COLBURN  3,255,577
RIDING TYPE POWER MOWER WITH FLOATING BLADES
Filed Oct. 18, 1963  2 Sheets-Sheet 1

INVENTOR.
Richard R. Colburn
BY
Scofield, Kokjer, Scofield & Lowe
ATTORNEYS.

United States Patent Office 3,255,577
Patented June 14, 1966

3,255,577
RIDING TYPE POWER MOWER WITH FLOATING BLADES
Richard R. Colburn, Phoenix, Ariz.
Filed Oct. 18, 1963, Ser. No. 317,287
10 Claims. (Cl. 56—25.4)

This invention relates to power operated self-propelling mowers, and refers more particularly to a riding type mower which is particularly suitable in the mowing of exceptionally wide swaths without scalping ridges, hummocks and the like, and the obtaining of a uniform cut over substantially the entire area being mowed.

The present invention represents an improvement in certain respects over that disclosed and claimed in my co-pending application serial 86,747, filed Feb. 2, 1961, and now Patent 3,118,266, entitled Riding Type Power Mower With Floating Blades.

One of the important objects of the present invention is to provide a means of suspending a wide swath, multiple blade rotary motor structure beneath the chassis of a tractor so that floating movement of the mower blades relative to the chassis is obtained while precenting swaying or sidewise shifting of the mower out of the path of advance of the unit. In my copending application referred to above, I have disclosed one satisfactory means of obtaining the desired results. The object of the present invention is to obtain substantially the same result but with a structure which is simpler to manufacture and which has certain advantages in field operation and in assembly and disassembly with the tractor unit over the invention of the aforesaid application.

Another object of the invention is to provide a tractor powered mower in which the central mower section is supported so that it provides generally a change of the mowing plane responsive to uneven ground contours encountered by the front wheels of the tractor unit. In the preferred form of the invention, the front axle member of the tractor is mounted for rocking movement about a central longitudinal axis and the axle member forms a part of the suspension system for the mower. It is a particularly advantageous feature of the invention in this respect, that despite the tractive connection between the axle and the mower, the mower is free to rise and fall relative to the axle member and to pivot also with respect thereto.

Still another object of the invention is to provide a mowing unit of the character described in which adjustment of the cutting height of the mower is easily accomplished while still retaining all of the advantages of the floating suspension.

Other and further objects of the invention together with the feature and novelty appurtenant thereto will appear in the course of the following description.

In the accompanying drawings which form a part of the specification and are to be read in conjunction therewith and in which like reference numerals indicate like parts in the various views;

FIG. 3 is a fragmentary front elevational view of the unit.

Figure 1:
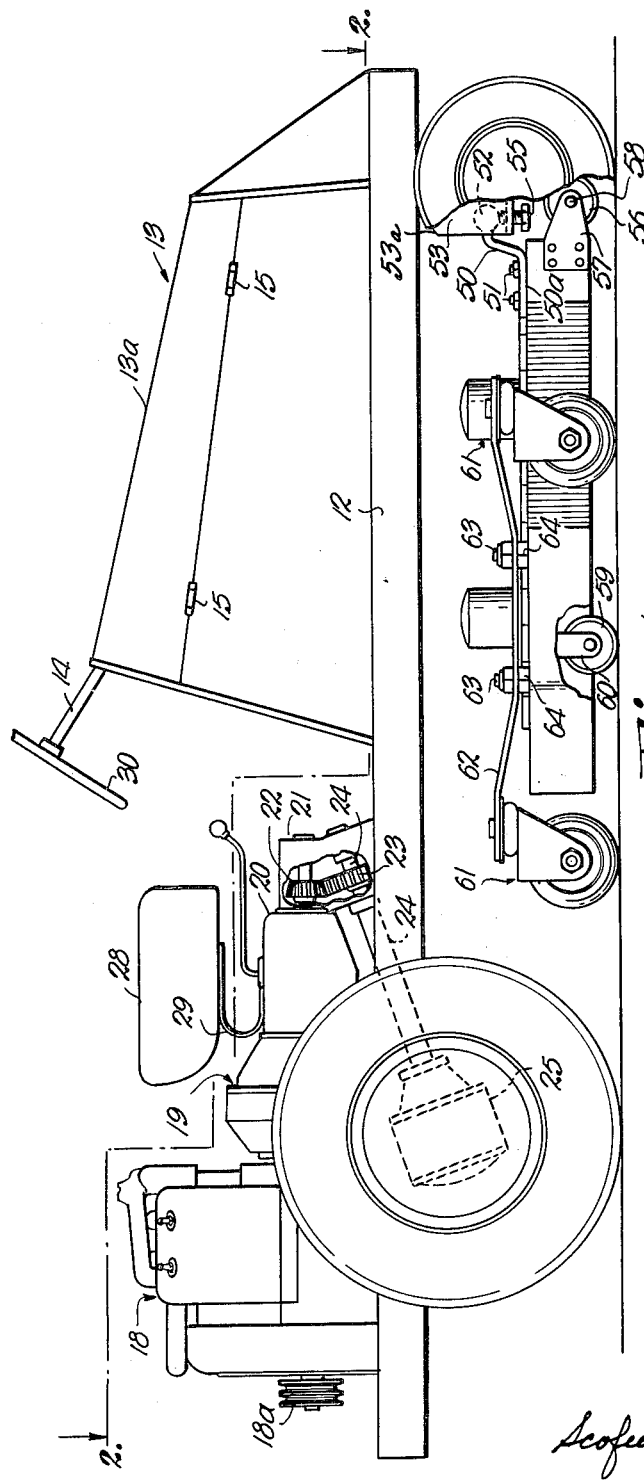
FIG. 1 is a side elevational view of a preferred embodiment of a mowing unit embodying the invention.
Figure 2:
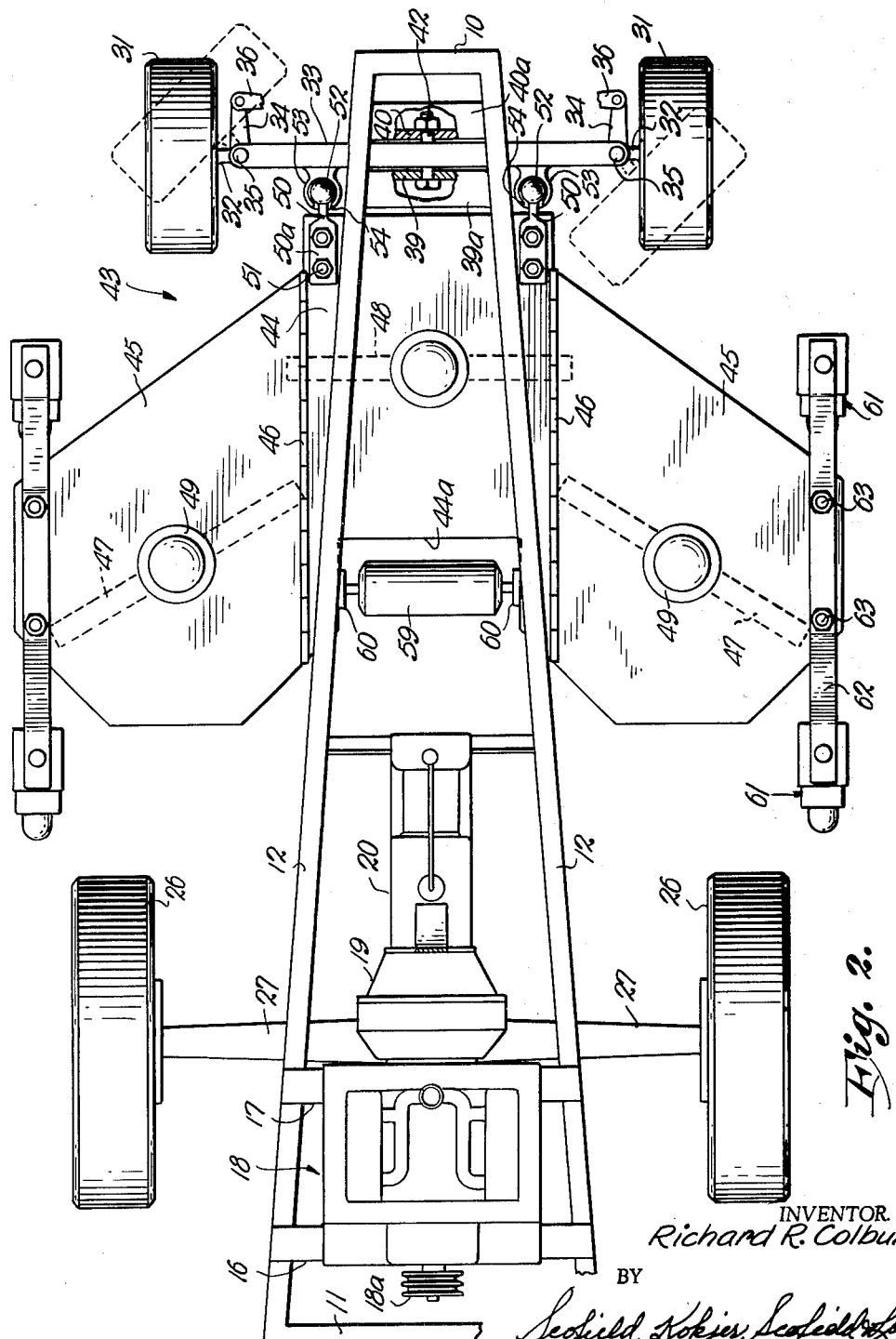
FIG. 2 is a generally sectional view taken along the line 2—2 of FIG. 1 in the direction of the arrows.

Referring now to the drawings, the chassis of the unit is best seen in FIGS. 1 and 2. The frame of the chassis comprises a generally trapezoidal open frame, having the front cross bar 10 and rear cross bar 11. These are joined by the forwardly converging side rails 12. The frame members may be of any suitable cross section, such as a channel shape, and are preferably joined by welding at the frame corners. A forward hollow hood section 13 may be provided, this enclosing partially the steering column 14. If desired the hood may be provided with the access door 13a which is hinged to the hood as at 15. The interior of the hood can serve to hold a hydraulic fluid reservoir and storage battery.

Mounted at the rear portion of the frame on cross bars 16, 17 is the main power unit 18 for the mower. This can be a conventional internal combustion engine provided with rear power take-off 18a. The drive shaft of motor 18 is connected into an automatic clutch 19 and transmission 20 terminating with the gear box 21. Gear box 21 contains bevel gear 22 which meshes with a similar gear 23 inclined at an angle thereto. The gear 23 is mounted on a shaft 24 which leads to the differential 25. The differential 25 drives the wheels 26, being connected therewith to axles extending through the rear axle housing 27.

The operator's seat is indicated at 28, this being conveniently supported on leaf spring 29 connected with and secured to the top of the transmission housing. The seat is located in convenient operating proximity with the steering wheel 30 mounted at the outer end of the steering column 14.

The front wheels 31 of the unit are carried on suitable stub axles 32 at the opposite ends of a front axle member 33. The stub axles are formed as one leg of bell crank members having the forwardly projecting leg 34. The respective bell cranks are each pivoted to the axle member 33 by king pins 35. The ends of legs 34 are each connected with steering links or tie rods 36 which come together and are pivotally connected at 37 with an arm 38 at the front terminal of the steering column.

The axial member 33 has its central portion disposed loosely between a pair of vertically oriented, fore and aft spaced plates 39, 40 which depend below the forward portion of the frame. The plates may be integral with or otherwise secured to flanges 39a, 40a which in turn are welded or bolted, as desired, to the frame structure. The axle member is connected with the plate members 39, 40 by a fore and aft pin 42 which extends through the plate members and through the axle member. Obviously the axle member is free to rock about the axis of pin 42, and thus the axle member 33 can rock relative to the frame as the wheels 31 encounter irregular terrain.

Located between the frame and between the front and rear wheels is the mowing mechanism, the central element of which comprises the housing or blade mounting platform 43. The plan of the housing is generally similar to that shown in my copending application Ser. No. 86,747, being adapted for the mounting of three rotary blades which have serially overlapping cutting paths as the unit is propelled forwardly. In the preferred embodiment of the invention, the housing or platform 43 is sub-divided into three sections; the central section 44 having the notched rear end 44a, and the two flanking similar side or wing sections 45 on opposite sides thereof. The wing sections 45 form continuations of the central section and are hingedly connected therewith by the barrel hinges 46. It will be noted from FIG. 3 that the confronting edges of the adjoining sections of the housing are relieved along the line of juncture as at 45a and 44a in order to permit limited downward movement of each wing section 45 relative to the central section 44. The extent of relief should be sufficiently limited as to cause binding or engagement between the sections 45a and 40a prior to interference between the blade ends carried by sections 45 and the underside of the central housing 44.

As has been earlier mentioned, each section of the housing carries its own blade, the individual blades being identified respectively by reference numeral 47 in the wing sections 45 and 48 in the central housing section 44. Each blade is drivingly connected by suitable shafting to a corresponding hydraulic motor 49 which is secured in any suitable fashion to the top of the housing section which carries the particular blade. The hydraulic motors are of conventional, commercially available construction. Since they play no part in the present invention, I have not shown the hydraulic lines leading thereto nor the source of hydraulic fluid. For the purposes of the present application, it is sufficient to note that the drive to the hydraulic pump can be supplied by power take-off 18a of the engine in the fashion illustrated in my copending application Ser. No. 86,747.

To support the mower housing 43 at its forward end, the central section 44 is provided with a pair of similar laterally spaced arm elements 50 which rise upwardly from the forward portion of the section 44 on opposite sides thereof. The arms are secured in the preferred embodiment to the section 44 by forming their rearward ends as flat sections 50a which are bolted as by bolts 51 to the section. The forward ends of the arms 50 have connected therewith or preferably formed integrally therewith the ball members 52.

The ball members 52 are slidably fitted within upstanding tubular guide members 53 secured to the front axle member 33. The spacing of the guide members 53 corresponds to that of the ball members and the guide members 53 are secured to the axle member 33 in any suitable fashion, preferably by welding. The rearward side wall of each tubular member 53 is provided with an upright elongate slot 54 through which the corresponding arm 50 extends. It will be understood that the ball members 52 are sufficiently loose within the guide members that the ball elements can rise and fall and pivot within the guide members with ease.

Normally the ball members 52 will be at the lower ends of the guide members. Bolts 55 are threaded into the lower end of the guides 53, the inner end of the bolts serving as seats for the ball members 52. Obviously by raising or lowering the bolts, the elevation of the ball elements 52 can be varied within limits.

It will be noted that directly in front of the central section 44 is supported a horizontal roller 56. This roller is supported in endwise fashion between brackets 57 which in turn are secured to and extend forwardly from the front of the central section 44. The roller is journalled on pins 58 carried by said brackets. The roller is supported at an elevation that normally maintains it free of engagement with the ground. A similar roller 59 is located at the rear of the section 44 in the notch 44a. This roller is supported by upright brackets 60 secured to the housing. A plurality of apertures aligned in the vertical direction is provided in each of the brackets 60, as shown in FIG. 1, so as to permit vertical adjustments of the position of the roller 59 to accommodate different cutting heights for the mower.

The outer edges of the flanking or wing sections 45 of the mower housing are supported by the outrigger structures now to be described.

Each outrigger comprises a pair of caster wheels 61 aligned in a fore and aft direction and located respectively in front of and to the rear of the adjoining housing section. Each of the caster wheels is mounted by a caster swivel to the end of a support member 62 which is centrally bolted by bolts 63 to the top of the housing section. Interposed between the housing section and the support 62 are the shim bolts 64, which may be added to or removed in order to adjust the elevation of the housing section relative to the caster wheel units.

In operation, the tractor unit is ordinarily driven in a forward direction and it will be understood that hydraulic fluid is being supplied to the hydraulic blade motors 49. As the tractor advances and if it remains on level ground, the sections 45 and 44 will remain in a common plane, and are supported by the outrigger caster wheels 61, the rear roller 59 and the front suspension system embracing the tubular guide members 53 and the ball elements 52 contained therein. The balls will seat on the heads of the bolts 55.

Obviously, as the outrigger sections encounter ridges and valleys, the caster wheels will follow the ground contour and by virtue of the hinge connections 46, the outer or flanking wings 45 of the housing can rise and fall with respect to the central section 44. Similarly, as the wheels 31 alternately encounter the ridges or valleys, the axle member 33 will rock about its pivot axis 42 and this tilting action will be carried through to the central housing section 44 through the ball and guide connection. Freedom of movement in the central section and the flanking sections 45 is obtained through the hinge connections therebetween, and the free swivel action in the caster wheels. It will be understood of course that at all times the mower itself is drawn by the tractor through the ball and guide connection.

There may of course be occasions where the front outrigger wheels 61 will encounter hills which are to the sides of the path of the front wheels 31. In this case, the upward thrust will be transmitted to the central section and since the ball elements are free to rise in the guides while still maintaining traction, the sections of the housing can be raised independently of any up and down movement of the front wheels. In the event there is a hummock which is of less width than the span of the front tractor wheels, this hummock will be engaged by the central front roller 56 with the result that again the front of the housing is raised relative to the front wheels. The outrigger wheels 61 and the rear roller 59 all cooperate to cause the elevation of the mower housing as unevenness in the terrain is encountered after the front wheels have passed. By virtue of the ball and guide connection, the mower housing is capable of pivoting about a common axis passing through the balls 52 and running transversely of the unit. This axis of course can shift up and down due to the vertical moveability of the balls in the guide members.

Whenever it is desirable to disconnect the mowing unit from the tractor, this can be accomplished simply by raising the ball elements 52 until they clear the tops of the guide elements. To facilitate this, it will be noted that the upper ends of the guide elements are in each case cut on a bias as at 53a. Reconnecting the mowing unit with the tractor is effected by simply replacing the ball elements in the guides. It will be understood that the ball elements have sufficient freedom within the guides as to prevent binding while still providing sufficient surface to carry the thrust loads imposed by the traction exerted on the mower components.

From the foregoing it will be seen that this invention is one well adapted to attain all of the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In a riding type power operated mower, the combination of a chassis including a frame and front and rear wheels supporting said frame, power drive means mounted on said frame and connected with at least one of said wheels for propelling said chassis, a normally substantially horizontal mower housing section positioned centrally beneath said frame between said front and rear wheels, and a combined front suspension and draft means connecting said housing section with said chassis, said last named means including a pair of vertically elongate, laterally spaced ball guide members and a pair of ball members, one ball member in each guide member and retained but vertically slidable therein, one pair of said members connected to said housing section and the other pair to said frame, said pairs of ball and guide members vertically moveable relative to one another to permit rising and falling of the forward portion of said housing section relative to said chassis without lateral swinging or twisting thereof.

2. In a riding type power operated mower, the combination of a chassis including a frame and front and rear wheels supporting said frame, power drive means mounted on said frame and connected with at least one of said wheels for propelling said chassis, a normally substantially horizontal mower housing section positioned centrally beneath said frame between said front and rear wheels, and a combined front suspension and draft means connecting said housing section with said chassis, said last named means including a pair of ball members supported in laterally spaced relationship and from the forward portion of said housing section and a pair of similarly spaced, vertical tubular guide members adapted to receive the respective ball members in a retained but vertically slidable fit, said guide members supported from said chassis.

3. In a riding type power operated mower, the combination of a chassis including a frame and front and rear wheels supporting said frame, power drive means mounted on said frame and connected with at least one of said wheels for propelling said chassis, a normally substantially horizontal mower housing section positioned beneath said frame between said front and rear wheels, and a combined front suspension and draft means connecting said housing section with the chassis, said last named means including a pair of tubular guide members depending from said chassis in laterally spaced relationship with the spacing transverse of the longitudinal center line of the chassis, a pair of arms secured to said housing section and extending into said guide members through elongate, vertical slots in said guide members, and ball elements on said arms and contained within the respective guide members in a slidable fit whereby to permit up and down and pivotal movement of said ball elements and arms relative to said frame.

4. The combination as in claim 3 including adjustable stop means associated with the respective guide members and operable to vary the lowermost limit of movement of said ball elements in said guide members.

5. In a riding type power operated mower, the combination of a chassis including a frame and front and rear wheels supporting said frame, power drive means mounted on said frame and connected with at least one of said wheels for propelling said chassis, a normally substantially horizontal mower housing section positioned beneath said frame between said front and rear wheels, and a combined front suspension and draft means connecting said housing section with the chassis, said last named means including a set of tubular guide members depending from said chassis in laterally spaced relationship with the spacing transverse of the longitudinal center line of the chassis, a pair of arms secured to said housing section and extending into the respective guide members through elongate, vertical slots in said guide members, and ball elements on said arms and contained within the respective guide members in a slidable fit whereby to permit up and down and pivotal movement of said ball elements and arms relative to said frame, ground engageable means on the front of said section normally spaced above the ground but operable to effect raising of the forward end of said section in response to contact with ridges, and ground engaging means supporting the rearward portion of said section.

6. In a riding type power operated mower, the combination of a chassis including a frame and a front axle member pivotally supported from said frame for rocking movement about a central axis running lengthwise of said chassis, a pair of normally vertical, tubular guide members mounted on said axle member, one on each side of said axis, said guide members each provided with a longitudinal slot in the side wall thereof, a mower housing section disposed beneath said chassis to the rear of said guide members, a pair of laterally spaced arms secured to said housing section and extending into the respective guide members through said slots, and vertically moveable ball members inside said guide members and secured to the arms whereby to permit rising and falling of said housing sections relative to said axle member and pivoting thereof about a common axis through said balls.

7. In a riding type power operated mower, the combination of a chassis including a frame and a front axle member pivotally supported from said frame for rocking movement about a central axis running lengthwise of said chassis, a normally substantially horizontal mower housing section positioned beneath said frame between said front and rear wheels, and a combined front suspension and draft means connecting said housing section with said axle member, said last named means including a pair of ball members supported in laterally spaced relationship on opposite sides of said axis and from the forward portion of said housing section, and a pair of similarly spaced, vertical tubular guide members adapted to receive the respective ball members in a retained but vertically slidable fit, said guide members supported from said axle member.

8. In a riding type power operated mower, the combination of a chassis including a frame and a front axle member pivotally supported from said frame for rocking movement about a central axis running lengthwise of said chassis, a normally substantially horizontal mower housing section positioned beneath said frame between said front and rear wheels, and a front suspension means connecting said housing section with said axle member, said means including a pair of ball members supported in laterally spaced relationship on opposite sides of said axis and from the forward portion of said housing section, and a pair of similarly placed, vertical tubular guide members adapted to receive the respective ball members in a vertically slidable fit, said guide members supported from said axle member, ground engageable means on the front of said section normally spaced above the ground but operable to effect raising of the forward end of said section in response to contact with ridges, and ground engaging means supporting the rearward portion of said housing.

9. The combination as in claim 8 including adjustable stop means associated with respective guide members and operable to vary the lowermost movement of said ball members and said guide members.

10. In a riding type power operated mower, the combination of a chassis including a frame and front and rear wheels supporting said frame. power drive means mounted on said frame and connected with at least one of said wheels for propelling said chassis, a normally substantially horizontal mower housing section positioned centrally beneath said frame between said front and rear wheels, and a combined front suspension and draft means connecting said housing section with said chassis, said last named means including a pair of substantially upright tubular guide members connected with said chassis and located respectively on opposite sides of the fore and aft center line of the chassis, a pair of guided members slidably received in said tubular guide members for up and down movement therein and connected with said mower housing section, said guide and guided members respectively provided with cooperating surfaces which prevent the guided members from pulling sidewise out of the guide members with respect to the longitudinal axis thereof whereby the housing will be pulled with the chassis by the guide members, and stop means limiting the maximum downward displacement of said guided members with respect to said tubular guide members whereby to insure that the guided members are retained in the guide members.

References Cited by the Examiner

UNITED STATES PATENTS

| | | | |
|---|---|---|---|
| 2,139,970 | 12/1938 | Moore | 280—494 X |
| 2,838,124 | 6/1958 | Cramer | 56—25.4 X |
| 2,978,857 | 4/1961 | Smith et al. | 56—25.4 |
| 3,077,065 | 2/1963 | Samways et al. | 56—25.4 |
| 3,118,266 | 1/1964 | Colburn | 56—25.4 |

ABRAHAM G. STONE, *Primary Examiner.*

RUSSELL R. KINSEY, T. GRAHAM CRAVER,
*Examiners.*

M. C. PAYDEN, *Assistant Examiner.*